United States Patent [19]

Izzo

[11] Patent Number: 4,684,532

[45] Date of Patent: Aug. 4, 1987

[54] AQUEOUS BUTTER FLAVORED COMPOSITION, PREPARATION AND USE

[75] Inventor: Henry J. Izzo, Bridgewater, N.J.

[73] Assignee: Lever Brothers Company, New York, N.Y.

[21] Appl. No.: 857,208

[22] Filed: Apr. 29, 1986

[51] Int. Cl.⁴ .................... A23D 3/00; A23L 1/09; A23L 1/226

[52] U.S. Cl. ................................ 426/533; 426/603; 426/608; 426/650; 426/658; 426/804

[58] Field of Search ............... 426/533, 603, 608, 613, 426/650, 658

[56] References Cited

U.S. PATENT DOCUMENTS

| | | |
|---|---|---|
| 3,663,236 | 5/1972 | Holloway . |
| 3,689,289 | 9/1972 | Perret .................................. 426/533 |
| 3,780,184 | 12/1973 | Broderick et al. ................... 426/533 |
| 4,022,920 | 5/1977 | Doornbos et al. ................... 426/533 |
| 4,218,487 | 8/1980 | Jaeggi .................................. 426/533 |
| 4,272,299 | 6/1981 | Bush ............................... 426/533 X |
| 4,384,008 | 5/1983 | Millisor . |
| 4,414,229 | 11/1983 | Bakal et al. . |
| 4,528,205 | 7/1985 | Turrisi . |

OTHER PUBLICATIONS

Woman's Day Encyclopedia of Cookery, vol. 2, Fawcett Publications, Inc., N.Y., 1966, p. 255.

*Primary Examiner*—Robert Yoncoskie
*Attorney, Agent, or Firm*—Milton L. Honig; James J. Farrell

[57] ABSTRACT

A process for obtaining an aqueous soluble butter flavor is disclosed comprising cooking together an aqueous combination of sugar and butter in a ratio of 50:1 to 1:10 at a temperature of about 150° F. to 250° F. for about 0.5–5 hours. The resultant emulsion is separated to recover an aqueous phase having a cooked butter flavor. When incorporated into low calorie table syrups, the flavor imparts a cooked butter taste and maintains the syrup as a clear composition. Low fat spreads may also successfully utilize the recovered cooked butter flavor phase.

12 Claims, No Drawings

AQUEOUS BUTTER FLAVORED COMPOSITION, PREPARATION AND USE

BACKGROUND OF THE INVENTION

1. Field of the Invention

The invention relates to a process for obtaining an aqueous butter flavor, the flavor composition resulting therefrom, and foods such as low calorie syrups containing the flavor composition.

2. The Prior Art

Consumers are becoming more calorie conscious. Yet, they do not wish to forego their favorite desserts and syrup toppings. Instead, they demand foods of lower calorie content that still retain the flavor and feel of the more weighty traditional high caloric foods. These needs have been recognized by the food industry. In particular, with regard to the present invention, there has been sought a low calorie syrup having the taste of real butter.

Full calorie syrups with butter taste traditionally have incorporated actual butter within the syrup composition. In low calorie syrups, with their high water content, there unfortunately arises problems when butter is sought to be formulated therein. Though butter is substantially insoluble in all syrups, when blended in lower calorie syrups unacceptable cloudiness results. Consumers desire their syrups to be clear.

Phase stability problems have been noted in U.S. Pat. No. 4,528,205 when small amounts of butter were incorporated into a reduced calorie syrup. The patent overcomes the instability problem by formulating the product with a thickener mixture of alginate and clarified xanthan gum. A disadvantage of this approach is the inflexibility of the formulation with regard to thickener and does not solve the adverse cloudy appearance. Combinations of alginate and clarified xanthan gum will provide one type of mouthfeel to the exclusion of different, perhaps more preferable, mouthfeel imparted by other thickener systems.

Accordingly, it is an object of this invention to provide a real butter flavor for reduced calorie syrups which provides clear compositions and avoids the requirement of a particular thickener system.

Another object of this invention is to provide a process for preparing an aqueous soluble butter flavor prepared from real butter having acceptable phase stability and organoleptic properties.

A further object of this invention is to provide a reduced calorie syrup with a clear appearance having the taste of real butter.

It is also an object of this invention to employ the aqueous soluble butter flavor in foods other than syrups such as margarines and low fat spreads.

SUMMARY OF THE INVENTION

A method for preparing a cooked butter flavor is provided comprising the steps of:
(i) cooking together an aqueous combination of sugar and butter in a ratio of 50:1 to 1:10 at a temperature of about 150° F. to 250° F. for about 0.5 to 5 hours resulting in formation of an oil in sugar water emulsion; and
(ii) separating a fatty phase from the emulsion and recovering an aqueous phase, said aqueous phase having a cooked butter flavor.

The invention also provides for the use of the foregoing aqueous phase, with its butter flavor, in primarily aqueous food compositions such as reduced calorie syrups and low fat spreads.

A low calorie edible syrup is provided comprising:
(i) from about 10 to 45% sugar solids by weight of total syrup, in water;
(ii) from about 0.01 to 1% of edible preservative; and
(iii) from about 1 to 10% of the separated butter flavored aqueous phase prepared according to the aforementioned method.

DETAILED DESCRIPTION OF THE INVENTION

It has now been found that a flavor equivalent to that of cooked butter and sugar may be obtained in an aqueous phase alone. Concentration, time and temperature parameters are critical in obtaining this flavor composition. Incorporation of this butter flavored aqueous phase into a reduced calorie syrup affords a clear non-cloudy liquid product.

The method of flavor preparation involves heating a water solution of sugar with butter at a temperature which may range from about 150° F. up to 250° F. Preferably, the temperature should range from about 170° F. to 230° F. These reactants may be heated together anywhere from 0.5 to 5 hours depending upon the particular temperature employed. At the upper temperature range, for example at 250° F., time is best limited to 0.5 hours or less. Around 150° F., there will be required a full 5 hours of heating contact time. Preferably, the heating time should range from 2 to 3 hours.

The term "sugar" is intended to embrace sugars broadly and include sucrose, lactose, maltose, dextrose, fructose and mixtures thereof. The amount of sugar to butter will range from 50:1 to 1:10. Preferably, the ratio of these two components will range from 10:1 to 1:1, and optimally about 5:1.

Water is an important component of the flavor generating mixture. It may be introduced with sugar in the form of a sugar syrup to the cook reactor. The amount of water may vary from about 10% to about 50% of the flavor generating cook mixture. Preferably, the amount of water will range from about 20% to about 30%.

A coarse emulsion forms in the reactor after liquid sugar and butter have been heated for the requisite time. In the final step of the process, the fat phase is separated from this emulsion. Separation may readily be accomplished by use of a centrifuge. It was surprising to note that the aqueous phase contained butter flavor but essentially none of the butter fat. Aqueous phase was used to flavor reduced calorie table syrup. Although directed to table syrups, the aqueous phase butter flavor composition may have other utility such as a flavorant for margarine or low fat spreads.

The following discussion focuses upon reduced calorie syrups into which the present aqueous phase butter flavor may be incorporated. Reduced calorie syrups contain no more than about 70 calories per fluid ounce. It is desirable to avoid artificial sweetening agents. Sugar is present as the primary sweetening agent. Among the types of sugar suitable are cane or beet sugars, sucrose, glucose, maltose, fructose, high or low conversion corn syrups and molasses. The sugar is used in an amount such that the total sugar solids content of the product does not exceed 45% by weight. Sugar solids may range from about 10% to 45%. Preferably, the total is maintained within the range of about 38 to 45% by weight. Lower amounts of sugar can be used with a corresponding reduction in sweetness. Except for the other ingredients disclosed in their specific amounts, water constitutes the balance of the syrup formulation.

To ensure microbiological stability, a small amount of edible preservative is added to the composition. Illustrative preservatives are sodium benzoate, sorbic acid and mixtures thereof. The preservative is present in an amount from about 0.01 to 1% by weight of the total syrup. Preferably, it is present from about 0.1 to 0.5%.

Acidulants and buffers may be present in the syrups. For example, sodium citrate is useful in adjusting pH. These type ingredients are found in amounts ranging from 0.01 to 1.0%.

Anti-flocculents and sugar anti-crystallization additives may be deemed necessary in certain formulations. Sodium hexametaphosphate serves both purposes and, therefore, it is frequently utilized. Cap-lock caused by sugar crystallization is avoided by incorporating this additive. Heavy metals that may exist in the composition are tied-up by sodium hexametaphosphate thereby preventing flocculation. Amounts of these additives generally range from 0.001 to 0.5%; preferably, from 0.01 to 0.10%. Salt may also be present in the formulation in an amount from about 0.1 to 1% to accentuate sweetness.

The following examples will more fully illustrate the embodiments of this invention. All parts, percentages and proportions referred to herein and in the appended claims are by weight unless otherwise indicated.

EXAMPLE 1

The following Example illustrates the effects of time, temperature and starting material concentrations upon flavor.

Five experiments were run, two of these at 180° F., two at 210° F. and one at 220° F. A mixture of aqueous 83% sugar syrup and 17% butter was heated together in a vessel under agitation. The aqueous and fatty phase were then separated by use of a centrifuge. Flavor evaluations were then performed on the aqueous phase. Taste panels consisted of 3 to 6 expert panelists. There was evaluated for each temperature a 2 hour and a 3 hour cook time. As seen in Table I, the three hour cook at 180° F. provided a better butter flavor than the 2 hour run. Samples 3 and 4 evaluated the impact of increased temperature, i.e. 210° F., on taste; sample 5 evaluated 220° F. at 3 hours. A sufficient increase of temperature enhanced the cooked butter flavor (butterscotch). A disadvantage of using the higher temperature is that the boiling point of the syrup is about 216° F. and also the product tends to darken.

TABLE I

| Blend with 83% Liquid Sugar and 17% Butter | | | |
| --- | --- | --- | --- |
| Sample No. | Time (hrs.) | Temperature | Taste Evaluation (Aqueous Phase) |
| 1 | 2 | 180° F. | Mild Butter Flavor, Weak Butterscotch Flavor. |
| 2 | 3 | 180° F. | Excellent Butter Flavor, Mild Butterscotch Flavor. |
| 3 | 2 | 210° F. | Mild Butter Flavor, Weak Butterscotch Flavor. |
| 4 | 3 | 210° F. | Excellent Butter Flavor, Mild Butterscotch Flavor. |
| 5 | 3 | 220° F. | Good Butter Flavor, |

TABLE I-continued

| Blend with 83% Liquid Sugar and 17% Butter | | | |
| --- | --- | --- | --- |
| Sample No. | Time (hrs.) | Temperature | Taste Evaluation (Aqueous Phase) |
| | | | Excellent Butterscotch Flavor. |

The effects of increasing the initial sugar concentration are reported in Table II. Time and temperature conditions were kept identical to the aforementioned experiments. As can be seen from the Table, an increase in sugar lessened the butter flavor. Increased time improved flavor; however, moderately increased temperature, i.e. 210° F., provided no additional benefit.

TABLE II

| Blend with 98% Sugar and 2% Butter | | | |
| --- | --- | --- | --- |
| Sample No. | Time (hrs.) | Temperature | Taste Evaluation (Aqueous Phase) |
| 6 | 2 | 180° F. | Weak Butter Flavor. |
| 7 | 3 | 180° F. | Very Mild Butter Flavor but improved over Sample 5 |
| 8 | 2 | 210° F. | Same profile as the above 180° F. cook for 2 hours. |
| 9 | 3 | 210° F. | Same profile as the above 180° F. cook for 3 hours. |

A temperature of 250° F. was evaluated in conjunction with an 83% sugar and 17% butter starting mixture. The mixture was heated under pressure. Butter flavor was generated within 0.5 hours. Increased time beyond 0.5 hours was detrimental to the butter taste. At 1, 1.5 and 2 hours, a taste panel reported strong butterscotch, intense butterscotch and burnt taste, respectively, for each of Sample 10–13.

TABLE III

| Blend with 83% Sugar and 17% Butter | | | |
| --- | --- | --- | --- |
| Sample No. | Time (hrs.) | Temperature | Taste Evaluation (Aqueous Phase) |
| 10 | 0.5 | Pressure Cooking (250° F.) | Similar to Samples 2 and 5 but with more Butterscotch Flavor. |
| 11 | 1 | Pressure Cooking (250° F.) | Strong Butterscotch Flavor. |
| 12 | 1.5 | Pressure Cooking (250° F.) | Intense Butterscotch Flavor. |
| 13 | 2 | Pressure Cooking (250° F.) | Burnt Taste. |

A pair of reduced calorie syrups were blended, one incorporating the aqueous flavor phase of Sample 2 and the other that of Sample 10. The syrup flavored with Sample 2 was smooth and buttery. By contrast, the identical syrup flavored with Sample 10 was harsh and bitter.

EXAMPLE 2

An illustration of a reduced calorie syrup of the present invention, and the formula used in the taste evaluations of Example 1, is set forth below.

TABLE IV

| Ingredient | Weight % |
|---|---|
| Reduced Calorie Table Syrup | |
| Sugar | 43.00 |
| Butter Flavor Aqueous Phase | 2.08 |
| Gum: | 0.65 |
| Xanthan | |
| Propylene Glycol Alginate | |
| Sodium Carboxymethyl Cellulose | |
| Artificial Flavors/Colors | 0.45 |
| Natural Flavors | 0.40 |
| Salt | 0.30 |
| Sodium Pyrophosphate/Citrate/Fumaric Acid | 0.12 |
| Sodium Hexametaphosphate | 0.10 |
| Water | Balance |

EXAMPLE 3

The present example illustrates the use of the aqueous phase derived from Example 1 to impart a butter flavor to margarines and low fat spreads. Exemplary formulations are provided in Table V.

TABLE V

Margarine and Low Fat Spreads

| Ingredient (wt. %) | (wt. %) Margarine Product | (wt. %) Low Fat Spread |
|---|---|---|
| Basestock | 80 | 44.5 |
| Partially Hardened Soybean Oil (98.6%) | | |
| Cottonseed Oil (1.4%) | | |
| Distilled Monoglycerides | 0.3 | 0.3 |
| Lecithin | 0.2 | 0.2 |
| Color | 0.033 | 0.033 |
| Salt | 1.0 | 1.0 |
| Potassium Sorbate | 0.1 | 0.1 |
| EDTA | 0.0075 | 0.0075 |
| Lactic Acid | 0.02 | 0.02 |
| Sample 2 Aqueous Phase Butter Flavor | 2.0 | 2.0 |
| Water | Balance to 100 | |

The foregoing description and examples illustrate selected embodiments of the present invention and in light thereof variations and modifications will be suggested to one skilled in the art all of which are in the spirit and purview of this invention.

What is claimed is:

1. A method for preparing a cooked butter flavor comprising the steps of:
   (i) heating an admixture of an aqueous solution of sugar and butter in a ratio of sugar to butter of 50:1 to 1:10 at a temperature of about 150° F. to 250° F. for about 0.5 to 5 hours resulting in formation of an oil in sugar water emulsion; and
   (ii) separating a fatty phase from the emulsion and recovering an aqueous phase, said aqueous phase having a buttery flavor.

2. A method according to claim 1 wherein the ratio of sugar to butter is 10:1 to 1:1.

3. A method according to claim 1 wherein the ratio of sugar to butter is about 5:1.

4. A method according to claim 1 wherein the cooking temperature is from about 170° to about 230° F.

5. A method according to claim 1 wherein the cooking temperature is about 180° F.

6. A method according to claim 1 wherein the separation of aqueous from fatty phase in step (ii) is achieved by means of a centrifuge.

7. A separated buttery flavor aqueous phase prepared according to the method of claim 1.

8. A separated fatty phase prepared according to the method of claim 1.

9. A low calorie edible syrup comprising:
   (i) from about 10 to 45% sugar solids by weight of total syrup, in water;
   (ii) from about 0.01 to 1% of edible preservative; and
   (iii) from about 1 to 10% of the separated buttery flavor aqueous phase prepared according to the method of claim 1.

10. A syrup according to claim 9 wherein the amount of said separated buttery flavor containing aqueous phase ranges from about 1 to 5%.

11. A syrup according to claim 10 wherein the amount of said separated buttery flavor containing aqueous phase ranges from about 1 to 2.5%.

12. An edible water-in-oil emulsion, solid at refrigerator temperatures, comprising:
   (i) from about 30 up to 80% oil as a continuous phase;
   (ii) from about 70 to 20% water as the dispersed phase; and
   (iii) from about 1 to 10% by weight of said buttery flavor aqueous phase prepared according to claim 1.

* * * * *